United States Patent
Ichikawa

(10) Patent No.: US 8,655,530 B2
(45) Date of Patent: Feb. 18, 2014

(54) PARKING ASSIST DEVICE FOR VEHICLE AND ELECTRICALLY POWERED VEHICLE INCLUDING THE SAME

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/142,429

(22) PCT Filed: Apr. 21, 2010

(86) PCT No.: PCT/JP2010/057048
§ 371 (c)(1),
(2), (4) Date: Jun. 28, 2011

(87) PCT Pub. No.: WO2011/132272
PCT Pub. Date: Oct. 27, 2011

(65) Prior Publication Data
US 2013/0030615 A1    Jan. 31, 2013

(51) Int. Cl.
*G05D 3/00* (2006.01)
(52) U.S. Cl.
USPC ............................................................. 701/22
(58) Field of Classification Search
USPC ............................................................. 701/22
See application file for complete search history.

(56) References Cited

U.S. PATENT DOCUMENTS

| | | | |
|---|---|---|---|
| 5,821,731 A | | 10/1998 | Kuki et al. |
| 6,991,239 B2 * | | 1/2006 | Schutt et al. ............... 280/5.514 |
| 7,155,325 B2 | | 12/2006 | Tanaka et al. |
| 7,192,032 B2 * | | 3/2007 | Dodd et al. ................. 280/5.508 |
| 7,192,033 B2 * | | 3/2007 | Bolt et al. .................. 280/5.514 |
| 7,306,239 B2 * | | 12/2007 | Schutt et al. ............... 280/5.514 |
| 7,741,734 B2 | | 6/2010 | Joannopoulos et al. |
| 7,806,417 B1 * | | 10/2010 | Hanser et al. .............. 280/5.514 |
| 7,894,956 B2 * | | 2/2011 | Kondo et al. ................... 701/41 |
| 8,041,472 B2 * | | 10/2011 | Kobori et al. .................... 701/8 |
| 8,126,625 B2 * | | 2/2012 | Makino et al. ................. 701/65 |
| 8,169,340 B2 * | | 5/2012 | Oyobe et al. ............... 340/932.2 |
| 2003/0122687 A1 | | 7/2003 | Trajkovic et al. |

(Continued)

FOREIGN PATENT DOCUMENTS

| AU | 2006269374 B2 | 1/2007 |
|---|---|---|
| AU | 2006269374 C1 | 1/2007 |

(Continued)

OTHER PUBLICATIONS

Search Report issued in International Application No. PCT/JP2010/057048 dated Jul. 13, 2010 (with translation).

(Continued)

*Primary Examiner* — Mary Cheung
*Assistant Examiner* — Anne Mazzara
(74) *Attorney, Agent, or Firm* — Oliff PLC

(57) ABSTRACT

A control device controls a vehicle to perform position adjustment between a power transmission unit and a power reception unit based on a power receiving situation of the power reception unit. A height sensor is for sensing change in vehicle height of the vehicle. The control device uses relation between the power receiving situation and a distance between the power transmission unit and the power reception unit, which is predetermined according to an output from the height sensor, to perform the position adjustment between the power transmission unit and the power reception unit based on the output from the height sensor and the power receiving situation.

16 Claims, 6 Drawing Sheets

(56) References Cited

U.S. PATENT DOCUMENTS

| | | |
|---|---|---|
| 2003/0205869 A1* | 11/2003 | Schutt .................. 280/5.514 |
| 2007/0222542 A1 | 9/2007 | Joannopoulos et al. |
| 2008/0278264 A1 | 11/2008 | Karalis et al. |
| 2009/0040068 A1 | 2/2009 | Oyobe et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0049414 A1* | 2/2010 | Ohtomo et al. ............. 701/70 |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201204 A1* | 8/2010 | Sakoda et al. ............. 307/104 |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0057813 A1* | 3/2011 | Toledo et al. ............. 340/932.2 |
| 2011/0082612 A1 | 4/2011 | Ichikawa |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101277838 A | 10/2008 |
| CN | 101632216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-4-208032 | 7/1992 |
| JP | A-9-213378 | 8/1997 |
| JP | 11208496 A * | 8/1999 |
| JP | A-2003-182489 | 7/2003 |
| JP | A-2004-291865 | 10/2004 |
| JP | A-2005-512893 | 5/2005 |
| JP | A-2006-288034 | 10/2006 |
| JP | A-2007-97345 | 4/2007 |
| JP | A-2009-501510 | 1/2009 |
| JP | 2011-209251 * | 10/2011 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |

OTHER PUBLICATIONS

U.S. Appl. No. 13/128,968 in the name of Ichikawa filed May 12, 2011.

U.S. Appl. No. 11/992,386 in the name of Oyobe et al, filed Mar. 21, 2008.

U.S. Appl. No. 12/992,958 in the name of Ichikawa filed Nov. 16, 2010.

U.S. Appl. No. 10/809,545 in the name of Tanaka et al. filed Mar. 26, 2004.

* cited by examiner

PARKING ASSIST DEVICE FOR VEHICLE AND ELECTRICALLY POWERED VEHICLE INCLUDING THE SAME

TECHNICAL FIELD

The present invention relates to a parking assist device for a vehicle and an electrically powered vehicle including the same, and more particularly to a parking assist device for a vehicle in which electric power transmitted from a power transmission unit of a power feeding apparatus provided outside of the vehicle can be received by a power reception unit in a non-contact manner and stored in a power storage device, and an electrically powered vehicle including the same.

BACKGROUND ART

Japanese Patent Laying-Open No. 2007-97345 (Patent Literature 1) discloses a parking assist device that allows simple charging. This parking assist device includes a touch display having a display unit for displaying a situation around a vehicle and an input unit for entering a target parking position for the vehicle, and also includes a control device for performing parking assist control by calculating a route in accordance with the target parking position. The control device further performs, under predetermined conditions, position adjustment assist control between a vehicle-side power transmission/reception unit provided on the vehicle and an apparatus-side power transmission/reception unit of an apparatus provided on the ground. Preferably, the parking assist device further includes a back monitor camera for taking an image of the situation around the vehicle. When an identifier indicating the apparatus-side power transmission/reception unit is present in the vicinity of the target parking position in the taken surrounding situation, the control device recognizes a position of the identifier and performs the position adjustment assist control.

According to this parking assist device, a driver can simply perform charging, and feels less troublesome when performing the charging. Accordingly, this device is expected to contribute to spread of vehicles that need to be charged (see Patent Literature 1).

CITATION LIST

Patent Literature

PTL 1: Japanese Patent Laying-Open No. 2007-97345
PTL 2: Japanese Patent Laying-Open No. 2004-291865
PTL 3: Japanese Patent Laying-Open No. 2006-288034

SUMMARY OF INVENTION

Technical Problem

Wireless electric power transmission without a power cord or a power transmission cable has been receiving attention in recent years as a method of feeding electric power from a power feeding apparatus to a vehicle that needs to be charged. Electric power transmission using electromagnetic induction, electric power transmission using a microwave, and electric power transmission by resonance are three dominant techniques known for wirelessly transmitting electric power.

Resonance is a non-contact electric power transmission technique for causing a pair of resonators (e.g., a pair of self-resonant coils) to resonate with each other in an electromagnetic field (near field) to transmit electric power through the electromagnetic field, and can transmit a large amount of electric power of several kW across a relatively long distance (e.g., several meters).

In this electric power feeding method of non-contact type, position adjustment between a power transmission unit of a power feeding apparatus and a power reception unit mounted on a vehicle is important in order to feed electric power efficiently. Namely, when an electric power feeding method of non-contact type such as resonance is used to feed electric power from a power feeding apparatus to a vehicle, parking accuracy of the vehicle with respect to the power feeding apparatus is important in order to improve power feeding efficiency.

Accordingly, an object of the present invention is to improve parking accuracy of a vehicle in which electric power transmitted from a power transmission unit of a power feeding apparatus provided outside of the vehicle can be received by a power reception unit in a non-contact manner and stored in a power storage device, with respect to the power feeding apparatus.

Solution to Problem

According to the present invention, a parking assist device for a vehicle in which electric power transmitted from a power transmission unit of a power feeding apparatus provided outside of the vehicle can be received by a power reception unit in a non-contact manner and stored in a power storage device includes a vehicle control unit and a height sensor. The vehicle control unit controls the vehicle to perform position adjustment between the power transmission unit and the power reception unit based on a power receiving situation of the power reception unit. The height sensor is for sensing change in vehicle height of the vehicle. The vehicle control unit uses relation between the power receiving situation of the power reception unit and a distance between the power transmission unit and the power reception unit, which is predetermined according to an output from the height sensor, to perform the position adjustment between the power transmission unit and the power reception unit based on the output from the height sensor and the power receiving situation.

Preferably, the parking assist device for a vehicle further includes an image taking device and a guidance control unit. The image taking device takes an image of outside of the vehicle. The guidance control unit controls the vehicle to guide the vehicle to the power transmission unit based on the image taken by the image taking device. The control by the vehicle control unit is performed when the vehicle has been guided by the guidance control unit to a predetermined position with respect to the power transmission unit.

Preferably, a plurality of maps each indicating the relation between the power receiving situation of the power reception unit and the distance between the power transmission unit and the power reception unit are prepared in advance according to outputs from the height sensor. The vehicle control unit selects one of the maps based on an output from the height sensor, and uses the selected map to perform the position adjustment between the power transmission unit and the power reception unit based on the power receiving situation of the power reception unit.

Preferably, each of the maps defines relation between the power receiving situation of the power reception unit and an amount of positional deviation of the power reception unit with respect to the power transmission unit. The vehicle control unit uses the one of the maps selected based on the output from the height sensor to estimate the amount of positional deviation based on the power receiving situation of the power reception unit, and performs the position adjustment between the power transmission unit and the power reception unit based on the estimated result.

Preferably, the power reception unit is fixed to an underbody of the vehicle.

Preferably, the height sensor is provided on a suspension of the vehicle, and senses change in the vehicle height by measuring an amount of sinking of the vehicle with respect to a predetermined reference position.

Further, according to the present invention, an electrically powered vehicle includes any one of the parking assist devices described above, the power reception unit configured to receive electric power transmitted from the power transmission unit of the power feeding apparatus provided outside of the vehicle in a non-contact manner, the power storage device for storing the electric power received by the power reception unit, and a motor for receiving electric power supply from the power storage device and generates traveling torque.

Advantageous Effects of Invention

In the present invention, the relation between the power receiving situation of the power reception unit and the distance between the power transmission unit and the power reception unit, which is predetermined according to the output from the height sensor which senses change in vehicle height of the vehicle, is used to perform the position adjustment between the power transmission unit and the power reception unit based on the output from the height sensor and the power receiving situation. Accordingly, even if the vehicle height changes with change in the number of passengers or in the weight of luggage, accuracy of the position adjustment between the power transmission unit and the power reception unit is maintained. According to the present invention, therefore, parking accuracy of the vehicle with respect to the power feeding apparatus is improved.

DESCRIPTION OF EMBODIMENTS

Figure 1:
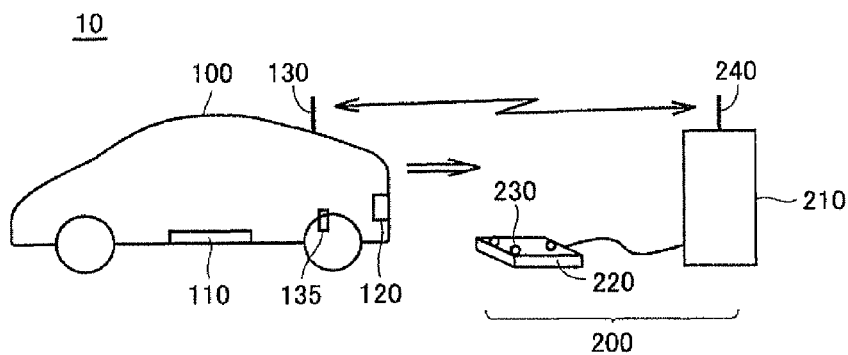
FIG. 1 is a general structure diagram of a vehicle power feeding system to which a parking assist device for a vehicle according to an embodiment of the present invention is applied.

Embodiments of the present invention will be described hereinafter in detail with reference to the drawings. It is noted that the same or corresponding parts have the same reference characters allotted in the drawings, and description thereof will not be repeated.

FIG. 1 is a general structure diagram of a vehicle power feeding system to which a parking assist device for a vehicle according to an embodiment of the present invention is applied. Referring to FIG. 1, a vehicle power feeding system 10 includes a vehicle 100 and a power feeding apparatus 200. Vehicle 100 includes a power reception unit 110, a camera 120, a communication unit 130, and a height sensor 135.

Power reception unit 110 is fixed to an underbody of vehicle 100, and configured to receive electric power transmitted from a power transmission unit 220 (to be described later) of power feeding apparatus 200 in a non-contact manner. Specifically, power reception unit 110 includes a self-resonant coil (to be described later), and receives electric power from power transmission unit 220 in a non-contact manner by resonating with a self-resonant coil included in power transmission unit 220 through an electromagnetic field. Camera 120 is provided to sense positional relation between vehicle 100 and power transmission unit 220, and attached to a car body in such a manner that it can take an image behind the vehicle, for example. Communication unit 130 is a communication interface for conducting communication between vehicle 100 and power feeding apparatus 200.

Height sensor 135 is a sensor for sensing change in vehicle height of vehicle 100. As an example, height sensor 135 is provided on a suspension of vehicle 100, and senses change in vehicle height by measuring an amount of sinking of the vehicle with respect to a predetermined reference position as magnetic displacement or resistive displacement. As height sensor 135, a laser displacement gage provided on the underbody may be used to directly measure change in distance from a road surface. A variety of known devices can be used as height sensor 135.

Power feeding apparatus 200 includes a power supply device 210, power transmission unit 220, light emission units 230, and a communication unit 240. Power supply device 210 converts a commercial AC electric power supplied from a system power supply, for example, to a high-frequency electric power, and outputs the same to power transmission unit 220. The high-frequency electric power generated by power supply device 210 has a frequency of 1 MHz to ten-plus MHz, for example.

Power transmission unit 220 is fixed to a floor surface of a parking space, and configured to transmit the high-frequency electric power supplied from power supply device 210 to power reception unit 110 of vehicle 100 in a non-contact manner. Specifically, power transmission unit 220 includes the self-resonant coil (to be described later), and transmits electric power to power reception unit 110 in a non-contact manner by resonating with the self-resonant coil included in power reception unit 110 through an electromagnetic field. The plurality of light emission units 230 are provided on power transmission unit 220 to indicate a position of power transmission unit 220. Each of light emission units 230 is formed of an LED, for example. Communication unit 240 is a communication interface for conducting communication between power feeding apparatus 200 and vehicle 100.

In vehicle power feeding system 10, power transmission unit 220 of power feeding apparatus 200 transmits a high-frequency electric power, and the self-resonant coil included in power reception unit 110 of vehicle 100 and the self-resonant coil included in power transmission unit 220 resonate with each other through an electromagnetic field, thereby feeding electric power from power feeding apparatus 200 to vehicle 100. In order to feed electric power efficiently from power feeding apparatus 200 to vehicle 100, position adjustment between power reception unit 110 of vehicle 100 and power transmission unit 220 of power feeding apparatus 200 needs to be performed by guiding vehicle 100 to power feeding apparatus 200. In this embodiment, parking control of vehicle 100 to power feeding apparatus 200 is performed in two stages.

In a first stage, steering of vehicle 100 is controlled based on an image taken by camera 120, thus guiding vehicle 100 to power transmission unit 220 of power feeding apparatus 200. More specifically, an image of the plurality of light emission units 230 provided on power transmission unit 220 is taken by camera 120, and positions and orientations of the plurality of light emission units 230 are recognized by image recognition. Then, positions and orientations of power transmission unit 220 and vehicle 100 are recognized based on the image recognition result, and steering is controlled based on the recognition result, thus guiding vehicle 100 to power transmission unit 220 of power feeding apparatus 200.

When the steering control is completed and vehicle 100 has been guided to a predetermined position with respect to power transmission unit 220, the parking control is switched from the first stage to a second stage. In the second stage, electric power is fed from power transmission unit 220 to power reception unit 110, and vehicle 100 is controlled in speed (decelerated/stopped) based on a power receiving situation of power reception unit 110, thus performing position adjustment between power transmission unit 220 and power reception unit 110. More specifically, a distance between power transmission unit 220 and power reception unit 110 is estimated based on the power receiving situation of power reception unit 110. Then, vehicle 100 is controlled in speed (decelerated/stopped) based on the estimated result, thus performing position adjustment between power transmission unit 220 and power reception unit 110.

As the vehicle height of vehicle 100 changes with change in the number of passengers or in the weight of luggage, the distance between power transmission unit 220 and power reception unit 110 changes. As a result, even if an amount of positional deviation (amount of deviation in a direction horizontal to the road surface) of power reception unit 110 with respect to power transmission unit 220 is the same, the power receiving situation of power reception unit 110 changes. In this embodiment, therefore, a plurality of maps each indicating relation between a power receiving situation (receiving voltage) and an amount of positional deviation are prepared in advance according to outputs from height sensor 135, and one of the maps is selected based on an output from height sensor 135. Then, the selected map is used to estimate the amount of positional deviation of power reception unit 110 with respect to power transmission unit 220 based on the power receiving situation of power reception unit 110, and position adjustment between power transmission unit 220 and power reception unit 110 is performed based on the estimated result.

It is noted that electric power transmitted from power transmission unit 220 in the second stage is set to be smaller than electric power supplied from power transmission unit 220 to power reception unit 110 after completion of the position adjustment between power transmission unit 220 and power reception unit 110. This is because the electric power transmission from power transmission unit 220 in the second stage is for the position adjustment between power transmission unit 220 and power reception unit 110, and thus a large amount of electric power for substantial power feeding is unnecessary.

Next, an exemplary non-contact electric power feeding method in vehicle power feeding system 10 will be described.

In this embodiment, electric power is fed from power feeding apparatus 200 to vehicle 100 by resonance.

Figure 2:
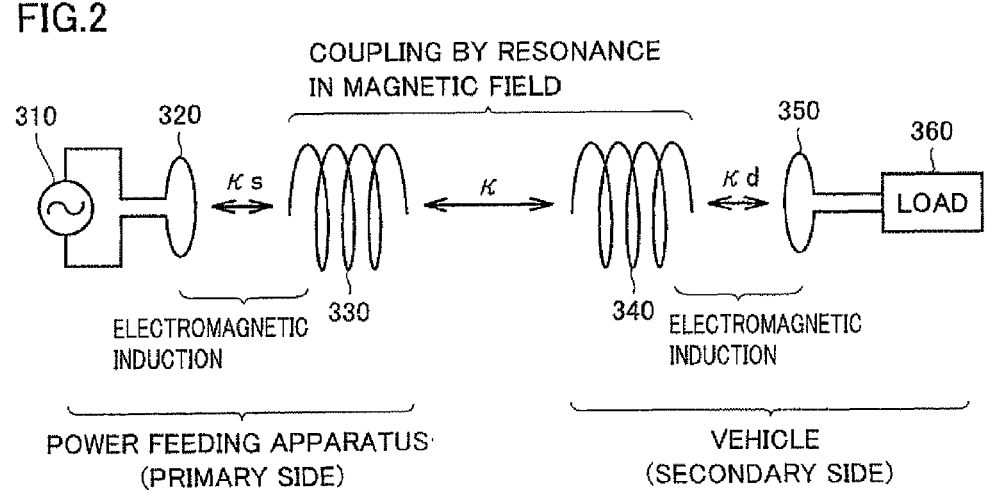
FIG. 2 illustrates the principles of electric power transmission by resonance.

FIG. 2 illustrates the principles of electric power transmission by resonance. Referring to FIG. 2, in this resonance, two LC resonant coils having the same natural frequency resonate with each other in an electromagnetic field (near field) in the same way that two tuning forks resonate with each other, thus transmitting electric power from one of the coils to the other coil through the electromagnetic field.

Specifically, a high-frequency power supply 310 is connected to a primary coil 320, and a high-frequency electric power of 1 MHz to ten-plus MHz is fed to a primary self-resonant coil 330 which is magnetically coupled to primary coil 320 by electromagnetic induction. Primary self-resonant coil 330 is an LC resonator having an inductance of the coil itself and a stray capacitance, and resonates with a secondary self-resonant coil 340 having a resonant frequency the same as that of primary self-resonant coil 330 through an electromagnetic field (near field). Consequently, energy (electric power) is moved from primary self-resonant coil 330 to secondary self-resonant coil 340 through the electromagnetic field. The energy (electric power) moved to secondary self-resonant coil 340 is taken by a secondary coil 350 which is magnetically coupled to secondary self-resonant coil 340 by electromagnetic induction, and supplied to a load 360. Electric power transmission by resonance is implemented when a Q value indicating resonant strength of primary self-resonant coil 330 and secondary self-resonant coil 340 is greater than 100, for example.

In terms of correspondence relation with FIG. 1, secondary self-resonant coil 340 and secondary coil 350 correspond to power reception unit 110 in FIG. 1, and primary coil 320 and primary self-resonant coil 330 correspond to power transmission unit 220 in FIG. 1.

Figure 3:
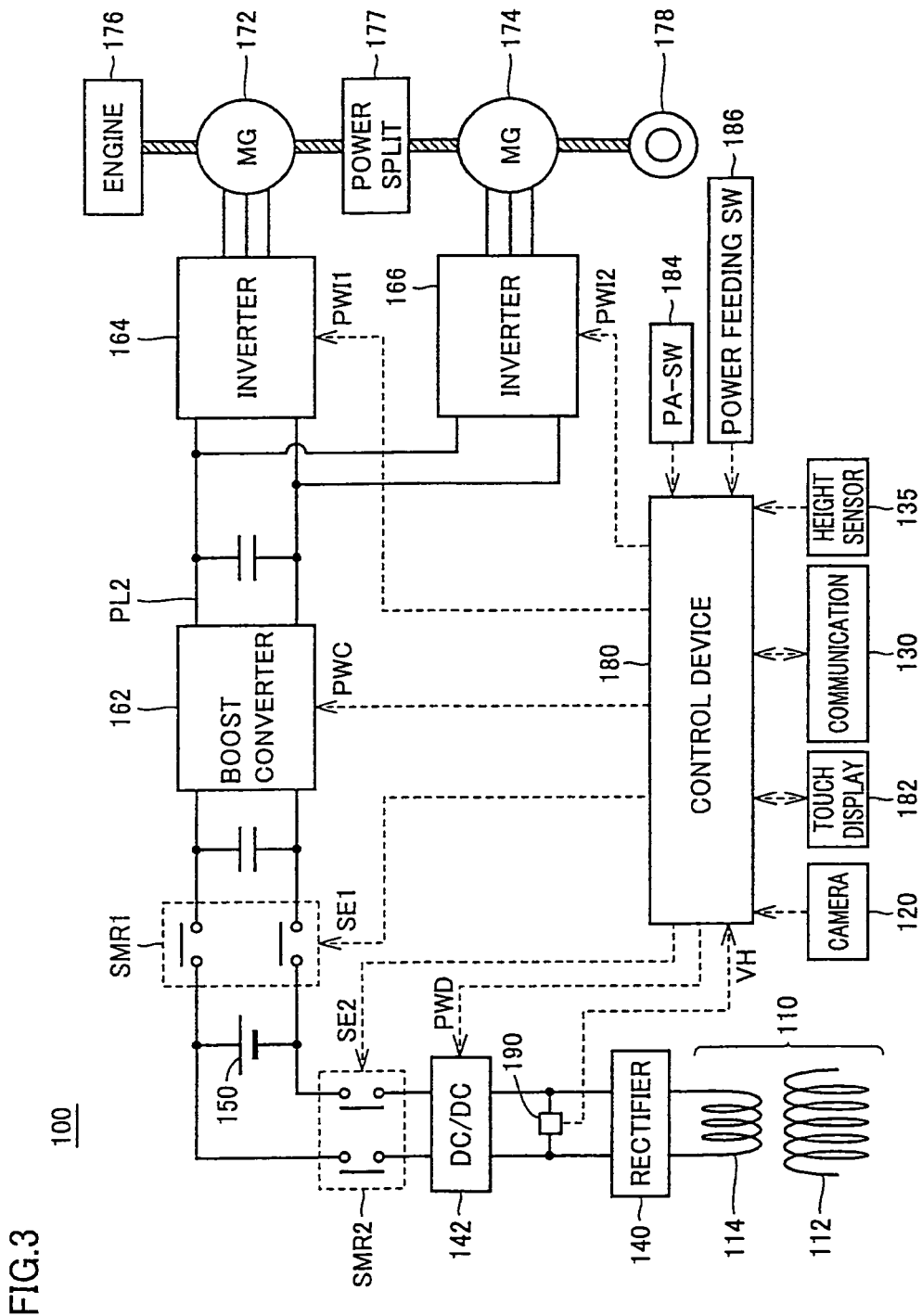
FIG. 3 is a detailed structure diagram of the vehicle shown in FIG. 1.

FIG. 3 is a detailed structure diagram of vehicle 100 shown in FIG. 1. Referring to FIG. 3, vehicle 100 includes a power storage device 150, a system main relay SMR1, a boost converter 162, inverters 164, 166, motor generators 172, 174, an engine 176, a power split device 177, and a drive wheel 178. Vehicle 100 also includes a secondary self-resonant coil 112, a secondary coil 114, a rectifier 140, a DC/DC converter 142, a system main relay SMR2, and a voltage sensor 190. Vehicle 100 further includes a control device 180, camera 120, communication unit 130, height sensor 135, a touch display 182, a parking assist switch (hereinafter also referred to as "PA switch") 184, and a power feeding request switch 186.

Vehicle 100 incorporates engine 176 and motor generator 174 as a driving source. Engine 176 and motor generators 172, 174 are linked to power split device 177. Vehicle 100 travels with a driving force generated by at least one of engine 176 and motor generator 174. Mechanical power generated by engine 176 is split into two paths by power split device 177. Namely, one is a path for transmitting the power to drive wheel 178, and the other is a path for transmitting the power to motor generator 172.

Motor generator 172 is an AC rotating electric machine, and formed of a three-phase AC synchronous motor having a rotor in which a permanent magnet is buried, for example. Motor generator 172 generates electric power by using kinetic energy of engine 176 which was split by power split device 177. When a state of charge (also referred to as "SOC," and represented in percentage with respect to a fully charged state, for example) of power storage device 150 becomes lower than a predetermined value, for example, engine 176 is started and motor generator 172 generates electric power, to charge power storage device 150.

As with motor generator 172, motor generator 174 is also an AC rotating electric machine, and formed of a three-phase AC synchronous motor having a rotor in which a permanent magnet is buried, for example. Motor generator 174 generates a driving force by using at least one of the electric power stored in power storage device 150 and the electric power generated by motor generator 172. The driving force from motor generator 174 is transmitted to drive wheel 178.

During braking of the vehicle or during acceleration reduction on a descending slope, mechanical energy stored as kinetic energy and potential energy in the vehicle is used via drive wheel 178 to drive motor generator 174 for rotation, so that motor generator 174 operates as a power generator. As a result, motor generator 174 operates as a regenerative brake for converting traveling energy to electric power to generate a braking force. The electric power generated by motor generator 174 is stored in power storage device 150.

Power split device 177 is formed of a planetary gear including a sun gear, a pinion gear, a carrier, and a ring gear. The pinion gear engages with the sun gear and the ring gear. The carrier supports the pinion gear in a rotatable manner, and is linked to a crankshaft of engine 176. The sun gear is linked to a rotation shaft of motor generator 172. The ring gear is linked to a rotation shaft of motor generator 174 and drive wheel 178.

Power storage device 150 is a rechargeable DC power supply, and formed of a secondary battery such as a lithium-ion battery or a nickel-metal hydride battery, for example. Power storage device 150 stores electric power supplied from DC/DC converter 142, and also stores regenerative electric power generated by motor generators 172, 174, Power storage device 150 supplies the stored electric power to boost converter 162, A capacitor having a large capacity, or any electric power buffer capable of temporarily storing electric power supplied from power feeding apparatus 200 (FIG. 1) and regenerative electric power from motor generators 172, 174 and supplying the stored electric power to boost converter 162 can be employed as power storage device 150.

System main relay SMR1 is provided between power storage device 150 and boost converter 162. System main relay SMR1 electrically connects power storage device 150 to boost converter 162 when a signal SE1 from control device 180 is activated, and cuts off an electrical path between power storage device 150 and boost converter 162 when signal SE1 is deactivated. Boost converter 162 boosts, in response to a signal PWC from control device 180, a voltage of a positive electrode line PL2 to be equal to or higher than a voltage output from power storage device 150, Boost converter 162 is formed of a DC chopper circuit, for example. Inverters 164, 166 are provided correspondingly to motor generators 172, 174, respectively. Inverter 164 drives motor generator 172 in response to a signal PWI1 from control device 180, and inverter 166 drives motor generator 174 in response to a signal PWI2 from control device 180. Inverters 164, 166 are each formed of a three-phase bridge circuit, for example.

Secondary self-resonant coil 112 is an LC resonant coil with open (unconnected) opposing ends, and receives electric power from power feeding apparatus 200 by resonating with a primary self-resonant coil (to be described later) of power feeding apparatus 200 through an electromagnetic field. A capacity component of secondary self-resonant coil 112 is a stray capacitance of the coil, however, a capacitor connected across both ends of the coil may be provided, Turns of secondary self-resonant coil 112 are set as appropriate to have a large Q value (e.g., Q>100) indicating resonant strength of the primary self-resonant coil of power feeding apparatus 200 and secondary self-resonant coil 112, large κ indicating a degree of coupling thereof and the like, based on a distance from the primary self-resonant coil, a resonant frequency of the primary self-resonant coil and secondary self-resonant coil 112, and the like.

Secondary coil 114 is provided coaxially with secondary self-resonant coil 112, and can be magnetically coupled to secondary self-resonant coil 112 by electromagnetic induction. Secondary coil 114 takes electric power received by secondary self-resonant coil 112 by electromagnetic induction, and outputs the same to rectifier 140. Secondary self-resonant coil 112 and secondary coil 114 form power reception unit 110 shown in FIG. 1.

Rectifier 140 rectifies the AC electric power taken by secondary coil 114. DC/DC converter 142 converts the electric power rectified by rectifier 140 to electric power having a voltage level of power storage device 150 in response to a signal PWD from control device 180, and outputs the same to power storage device 150. System main relay SMR2 is provided between DC/DC converter 142 and power storage device 150. System main relay SMR2 electrically connects power storage device 150 to DC/DC converter 142 when a signal SE2 from control device 180 is activated, and cuts off an electrical path between power storage device 150 and DC/DC converter 142 when signal SE2 is deactivated. Voltage sensor 190 detects a voltage VH between rectifier 140 and DC/DC converter 142, and outputs the detected value to control device 180.

While control of guiding and parking vehicle 100 to a desired parking position (hereinafter also referred to as "parking assist control") is performed, touch display 182 receives information about an image which has been taken by camera 120 from control device 180, and displays the received image information. In addition to displaying the image information, touch display 182 receives input from a user for determining a parking position for vehicle 100, and outputs information about the input parking position to control device 180. A display of a car navigation device can be used as touch display 182, for example.

Control device 180 generates signals PWC, PWI1, PWI2 for driving boost converter 162 and motor generators 172, 174, respectively, based on an accelerator position, a vehicle speed, and other signals from various sensors, and outputs generated signals PWC, PWI1, PWI2 to boost converter 162 and inverters 164, 166, respectively. During travel of the vehicle, control device 180 activates signal SE1 to turn system main relay SMR1 on, and deactivates signal SE2 to turn system main relay SMR2 off.

When PA switch 184 and power feeding request switch 186 are turned on by the user, control device 180 receives information about an image which has been taken by camera 120 from camera 120, and outputs the received image information to touch display 182. Control device 180 also receives information about a parking position which has been input by the user through touch display 182 from touch display 182. Further, control device 180 receives a detected value for voltage VH which has been detected by voltage sensor 190 from voltage sensor 190. Then, based on these pieces of data, control device 180 performs the parking assist control in a manner described later to guide vehicle 100 to power transmission unit 220 of power feeding apparatus 200 (FIG. 1).

When the position adjustment between power transmission unit 220 and power reception unit 110 of vehicle 100 is completed, control device 180 transmits a power feeding instruction to power feeding apparatus 200 via communication unit 130, and activates signal SE2 to turn system main relay SMR2 on. Further, control device 180 generates signal PWD for driving DC/DC converter 142, and outputs generated signal PWD to DC/DC converter 142. As a result, power feeding apparatus 200 starts charging power storage device 150.

PA switch 184 is a switch for the user to request parking assist with camera 120 and touch display 182. Power feeding request switch 186 is a switch for the user to request charging of power storage device 150 by power feeding apparatus 200.

Figure 4:
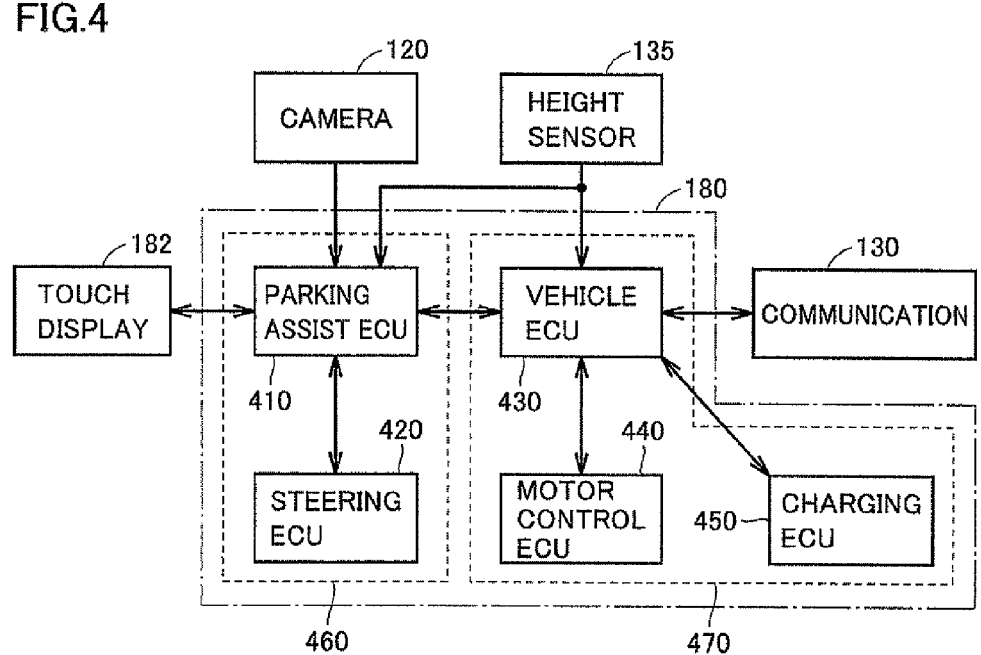
FIG. 4 is a functional block diagram of a control device shown in FIG. 3.

FIG. 4 is a functional block diagram of control device 180 shown in FIG. 3. Referring to FIG. 4, control device 180 includes a parking assist ECU (Electronic Control Unit) 410, a steering ECU 420, a vehicle ECU 430, a motor control ECU 440, and a charging ECU 450.

When not-shown PA switch 184 and power feeding request switch 186 are turned on, parking assist ECU 410 performs control for guiding vehicle 100 to power transmission unit 220 of power feeding apparatus 200 (FIG. 1) based on the image information received from camera 120.

Specifically, parking assist ECU 410 outputs the image information received from camera 120 to touch display 182, and recognizes power transmission unit 220 based on the image information. The plurality of light emission units 230 indicating a position and orientation of power transmission unit 220 are provided on power transmission unit 220. Then, parking assist ECU 410 recognizes positional relation with power transmission unit 220 (general distance and orientation) based on the image of the plurality of light emission units 230 shown on camera 120. Parking assist ECU 410 receives an output from height sensor 135, and corrects the positional relation based on the output from height sensor 135.

In addition, parking assist ECU 410 receives the information about the parking position which has been input by the user through touch display 182 from touch display 182. Then, based on the recognition result of power transmission unit 220 and the parking position information received from touch display 182, parking assist ECU 410 outputs a backing instruction to vehicle ECU 430 such that vehicle 100 will back up at a predetermined speed VS1, and outputs a steering instruction to steering ECU 420 such that vehicle 100 will be guided in an appropriate orientation to power transmission unit 220.

When the steering control is completed (i.e., a state where steering is no longer operated and the vehicle is only required to back up), and vehicle 100 has been guided to the predetermined position, parking assist ECU 410 notifies vehicle ECU 430 of the situation. As an example, the predetermined position may be a position where power transmission unit 220 falls outside of an image taking range of camera 120 by a predetermined amount due to approach of vehicle 100 to power transmission unit 220. Steering ECU 420 actually performs automatic steering control based on the steering instruction received from parking assist ECU 410.

During normal travel, vehicle ECU 430 outputs a control instruction to motor control ECU 440 in accordance with an operation situation of an accelerator pedal/brake pedal, a traveling situation of the vehicle and the like.

During the parking assist control, vehicle ECU 430 generates, in response to the backing instruction from parking assist ECU 410, a signal for driving motor generator 174 (FIG. 3) such that the vehicle will back up at speed VS1, and outputs the same to motor control ECU 440.

Then, in response to the notification from parking assist ECU 410 that vehicle 100 has been guided to the predetermined position with respect to power transmission unit 220, vehicle ECU 430 controls (decelerates/stops) vehicle 100 in speed based on a power receiving situation of power reception unit 110. As a result, position adjustment between power transmission unit 220 and power reception unit 110 is performed.

Specifically, vehicle ECU 430 generates a signal for causing the vehicle to back up at a speed VS2 lower than speed VS1, and outputs the same to motor control ECU 440. Further, vehicle ECU 430 transmits a power feeding instruction which requests electric power transmission for position adjustment to power feeding apparatus 200 via communication unit 130, and receives a detected value for voltage VH (FIG. 3) indicating the receiving voltage from power feeding apparatus 200 from charging ECU 450. Then, vehicle ECU 430 estimates the amount of positional deviation (amount of lateral deviation in the direction horizontal to the road surface) between power transmission unit 220 and power reception unit 110 based on the detected value for voltage VH.

Figure 5:
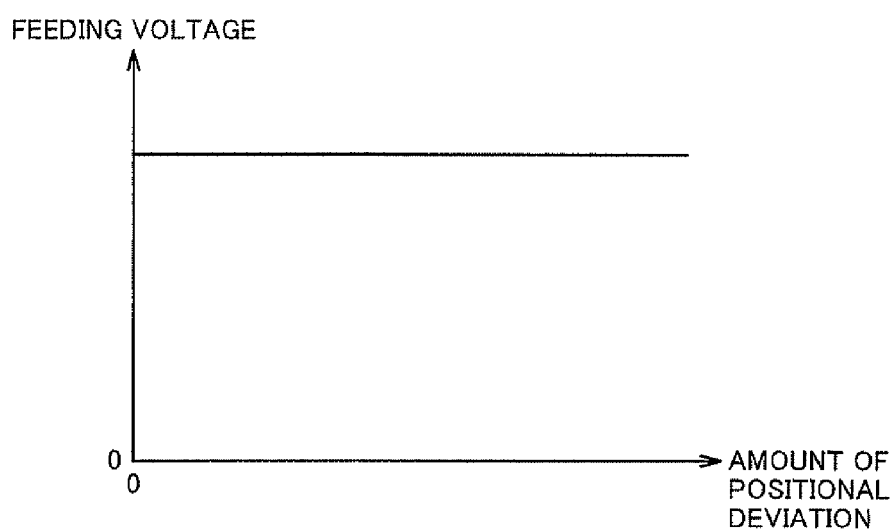
FIG. 5 illustrates relation between the amount of positional deviation of a power reception unit with respect to a power transmission unit and a feeding voltage.

That is, with respect to a constant feeding voltage (output voltage from power feeding apparatus 200) as shown in FIG. 5, voltage VH indicating the receiving voltage varies with a distance between power transmission unit 220 and power reception unit 110.

Figure 6:
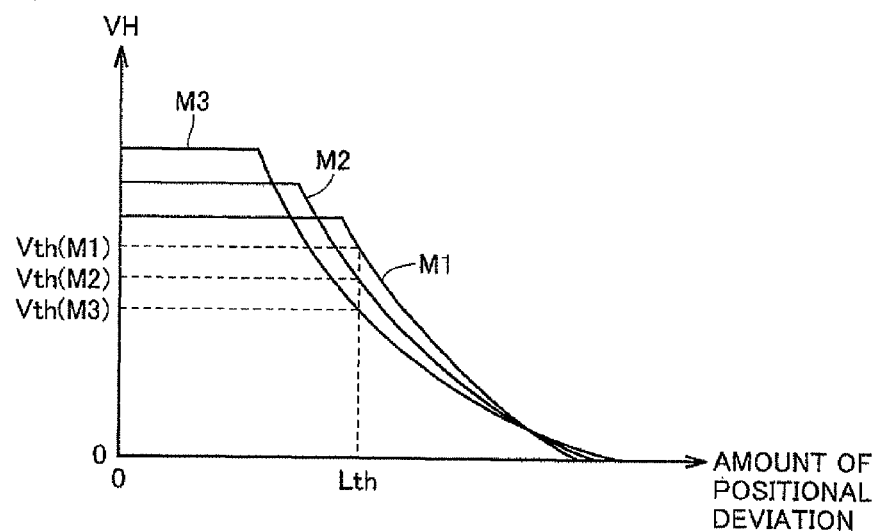
FIG. 6 illustrates relation between the amount of positional deviation of the power reception unit with respect to the power transmission unit and a receiving voltage.

FIG. 6 illustrates relation between the amount of positional deviation of power reception unit 110 with respect to power transmission unit 220 and the receiving voltage. The amount of positional deviation is 0 when power reception unit 110 faces power transmission unit 220. The output voltage from power feeding apparatus 200 is constant.

Referring to FIG. 6, curves M1 to M3 illustrate relation among different vehicle heights of vehicle 100, with the vehicle height becoming shorter in the order of curves M1, M2, M3. In this manner, as the vehicle height of vehicle 100 changes, the relation between the amount of positional deviation of power reception unit 110 with respect to power transmission unit 220 and the receiving voltage changes.

Figure 7:
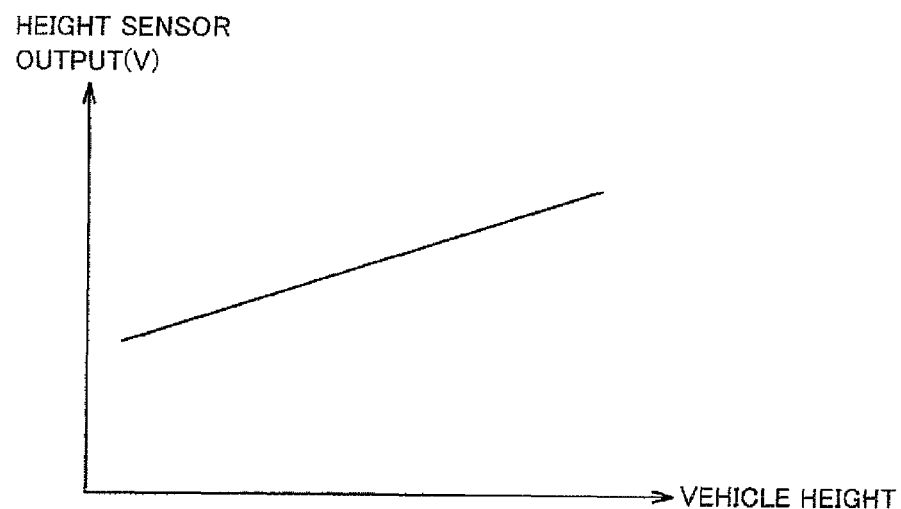
FIG. 7 illustrates an example of relation between change in vehicle height of a vehicle and an output from a height sensor.

FIG. 7 illustrates an example of relation between change in vehicle height of vehicle 100 and an output from height sensor 135. Referring to FIG. 7, as the vehicle height changes, the output from height sensor 135 changes.

In this embodiment, therefore, as shown in FIG. 6, a plurality of maps each indicating relation between an amount of positional deviation of power reception unit 110 with respect to power transmission unit 220 and voltage VH (receiving voltage) are prepared in advance according to outputs from height sensor 135. Then, one of the maps is selected based on an output from height sensor 135, and the selected map is used to estimate the amount of positional deviation of power reception unit 110 with respect to power transmission unit 220 based on voltage VH. When a value of voltage VH exceeds a value Vth of voltage VH which corresponds to a predetermined allowable value Lth of the amount of positional deviation, vehicle ECU 430 causes vehicle 100 to stop.

Referring again to FIG. 4, vehicle ECU 430 outputs an instruction indicating deceleration or stop of vehicle 100 to motor control ECU 440, based on the estimated result of the distance between power transmission unit 220 and power reception unit 110. When the position adjustment between power transmission unit 220 and power reception unit 110 is completed and vehicle 100 stops, vehicle ECU 430 transmits a power feeding instruction for charging power storage device 150 to power feeding apparatus 200 via communication unit 130, and outputs an instruction indicating start of charging of power storage device 150 to charging ECU 450.

Motor control ECU 440 controls motor generators 172, 174 and boost converter 162 based on the instruction from vehicle ECU 430. Specifically, motor control ECU 440 generates signals for driving motor generators 172, 174 and boost converter 162, and outputs the same to inverters 164, 166 and boost converter 162, respectively.

Charging ECU 450 receives the detected value for voltage VH indicating the receiving voltage from power feeding apparatus 200 from voltage sensor 190 (FIG. 3), and outputs the received value to vehicle ECU 430. Further, in response to the charging start instruction from vehicle ECU 430, charging ECU 450 activates signal SE2 output to system main relay SMR2 to turn system main relay SMR2 on. Then, charging ECU 450 generates a signal for driving DC/DC converter 142, and outputs the same to DC/DC converter 142. As a result, charging of power storage device 150 is performed.

In control device 180, parking assist ECU 410 and steering ECU 420 constitute a guidance control unit 460. Guidance control unit 460 controls steering of vehicle 100 based on the image taken by camera 120, thus guiding vehicle 100 to power transmission unit 220 of power feeding apparatus 200 (steering mode). In addition, vehicle ECU 430, motor control ECU 440 and charging ECU 450 constitute a vehicle control unit 470. Vehicle control unit 470 estimates the amount of positional deviation of power reception unit 110 with respect to power transmission unit 220 based on the power receiving situation (voltage VH) of power reception unit 110. Then, vehicle control unit 470 controls (decelerates/stops) vehicle 100 in speed based on the estimated result, thus performing position adjustment between power transmission unit 220 and power reception unit 110 (deceleration/stop mode).

The amount of positional deviation between power transmission unit 220 and power reception unit 110 is estimated using the map indicating the relation between the receiving voltage (voltage VH) of power reception unit 110 and the distance between power transmission unit 220 and power reception unit 110. Since the receiving voltage (voltage VH) depends on the distance between power transmission unit 220 and power reception unit 110, in this embodiment, the plurality of maps are prepared in advance according to outputs from height sensor 135 which senses change in vehicle height of vehicle 100. Then, one of the maps is selected based on an output from height sensor 135, and the selected map is used to estimate the amount of positional deviation between power transmission unit 220 and power reception unit 110 based on voltage VH.

Instead of the receiving voltage (voltage VH) of power reception unit 110, efficiency of electric power transmission from power transmission unit 220 to power reception unit 110 may be used as an index of the power receiving situation.

Figure 8:
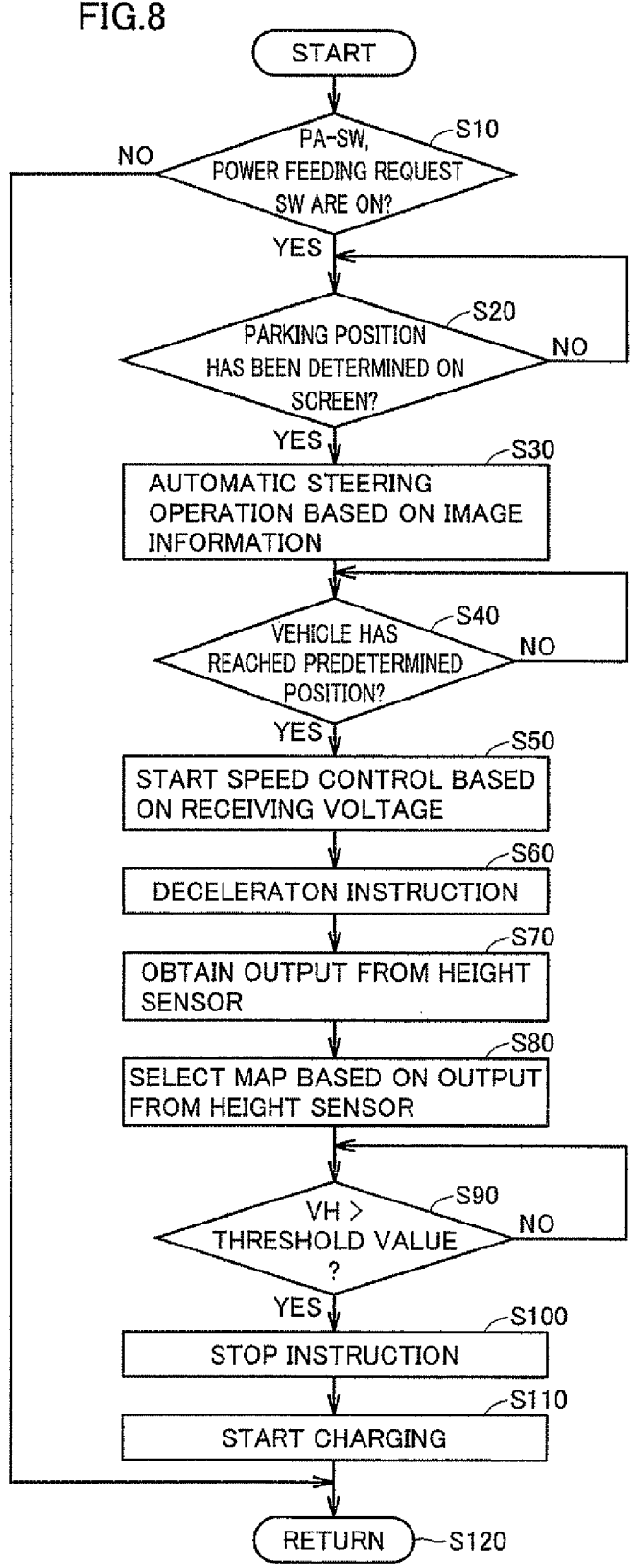
FIG. 8 is a flowchart showing a procedure of parking assist control performed by the control device shown in FIG. 3.

FIG. 8 is a flowchart showing a procedure of the parking assist control performed by control device 180 shown in FIG. 3. Referring to FIG. 8, control device 180 determines whether or not PA switch 184 and power feeding request switch 186 have been turned on by the user (step S10). If it is determined that these switches have not been turned on (NO at step S10), control device 180 proceeds to step S120 without performing a subsequent series of steps.

If it is determined at step S10 that PA switch 184 and power feeding request switch 186 have been turned on (YES at step S10), control device 180 determines whether or not a parking position for vehicle 100 has been determined by the user on a screen of touch display 182 (step S20).

If the parking position has been determined through touch display 182 (YES at step S20), the steering mode is used as a control mode, and control device 180 performs automatic steering operation by guidance control unit 460 including parking assist ECU 410 and steering ECU 420 based on the image information from camera 120 (step S30).

Then, control device 180 determines whether or not vehicle 100 has been guided to the predetermined position with respect to power transmission unit 220 of power feeding apparatus 200 (step S40), For example, when power transmission unit 220 shown on touch display 182 falls outside of the image taking range by the predetermined amount, it is determined that the vehicle has been guided to the predetermined position.

If it is determined at step S40 that the vehicle has reached the predetermined position (YES at step S40), the control mode is switched from the steering mode to the deceleration/stop mode. Then, control device 180 starts the speed control (deceleration/stop) by vehicle control unit 470 including vehicle ECU 430, motor control ECU 440 and charging ECU 450, based on the receiving voltage (voltage VH) of power reception unit 110 from power feeding apparatus 200 (step S50).

That is, control device 180 generates a deceleration instruction, and decelerates vehicle 100 from speed VS1 during the automatic steering operation to lower speed VS2 (step S60). In addition, control device 180 obtains an output from height sensor 135 (step S70). Then, control device 180 selects one of the plurality of maps which are prepared in advance, each indicating relation between voltage VH and an amount of positional deviation of power reception unit 110 with respect to power transmission unit 220, based on the output from height sensor 135 which was obtained at step S70 (step S80).

Then, control device 180 uses the selected map to determine whether or not a value of voltage VH indicating the receiving voltage has exceeded predetermined threshold value Vth (FIG. 6) (step S90). If it is determined that the value of voltage VH has exceeded threshold value Vth (YES at step S90), control device 180 generates a stop instruction, and causes vehicle 100 to stop (step S100).

When vehicle 100 stops, control device 180 transmits a power feeding instruction to power feeding apparatus 200, and causes power feeding apparatus 200 to start charging power storage device 150 (step S110).

Figure 9:
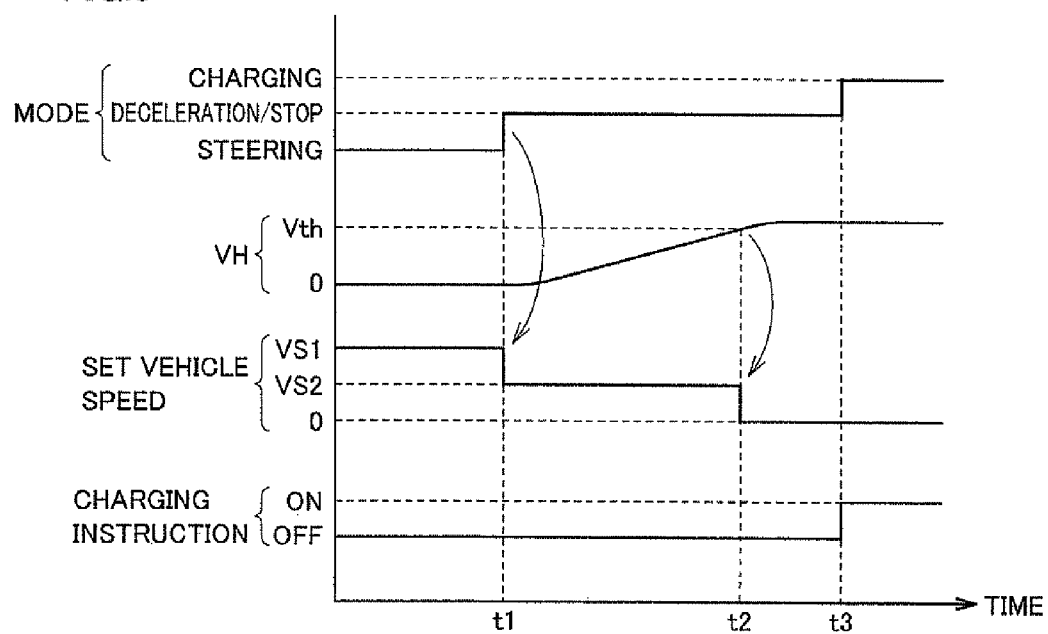
FIG. 9 is a waveform diagram of main signals while the parking assist control for a vehicle is performed.

FIG. 9 is a waveform diagram of main signals while the parking assist control for vehicle 100 is performed. Referring to FIG. 9, before time t1, guidance control unit 460 (FIG. 3) performs the steering control (steering mode). A backing speed of vehicle 100 in the steering mode is set to VS1.

When vehicle 100 has been guided to the predetermined position with respect to power transmission unit 220 at time t1 in the steering mode, the control mode is switched from the steering mode to the deceleration/stop mode, and vehicle control unit 470 (FIG. 3) performs the speed control of vehicle 100. At this timing, the backing speed of vehicle 100 is decelerated to VS2 lower than VS1.

As power reception unit 110 of vehicle 100 approaches power transmission unit 220 of power feeding apparatus 200, voltage VH indicating the receiving voltage from power feeding apparatus 200 increases. Then, when the value of voltage VH attains to threshold value Vth at time t2, which is defined in the map that has been selected based on the output from height sensor 135, it is determined that the amount of positional deviation between power transmission unit 220 and power reception unit 110 is within an allowable range, and the vehicle speed is set to 0, causing vehicle 100 to stop. Subsequently, the control mode is switched from the deceleration/stop mode to a charging mode at time t3, and a charging instruction indicating charging of power storage device 150 by power feeding apparatus 200 is output.

In this embodiment, as described above, the relation between the power receiving situation of power reception unit 110 and the amount of positional deviation of power reception unit 110 with respect to power transmission unit 220, which is predetermined according to the output from height sensor 135 which senses change in vehicle height of vehicle 100, is used to perform position adjustment between power transmission unit 220 and power reception unit 110 based on the output from height sensor 135 and the power receiving situation. Accordingly, even if the vehicle height changes with change in the number of passengers or in the weight of luggage, accuracy of the position adjustment between power transmission unit 220 and power reception unit 110 is maintained. According to this embodiment, therefore, parking accuracy of vehicle 100 with respect to power feeding apparatus 200 is improved.

Although camera 120 is installed on the rear of the vehicle on the assumption of reverse parking of vehicle 100 with respect to power feeding apparatus 200 in the above embodiment, camera 120 may be installed on the forward of the vehicle for forward parking of vehicle 100 with respect to power feeding apparatus 200.

Although electric power is transmitted in a non-contact manner from power feeding apparatus 200 to vehicle 100 by resonance in the above description, a method of transmitting electric power from power feeding apparatus 200 to vehicle 100 is not necessarily limited to resonance, but may be other non-contact electric power transmission methods such as electric power transmission using electromagnetic induction, or electric power transmission using a microwave. Also in these electric power transmission methods, a distance between power transmission unit 220 and power reception unit 110 can be estimated based on a situation of power feeding from power feeding apparatus 200 to vehicle 100.

Although the position and orientation of power transmission unit 220 are recognized by image recognition based on light emission units 230 in the above description, the shape and the like of power transmission unit 220 may be recognized by image recognition without providing light emission units 230. By providing light emission units 230 as in the above embodiment, the position and orientation of power transmission unit 220 can be recognized even at night.

Although a series/parallel hybrid car capable of splitting mechanical power of engine 176 by power split device 177 to transmit the resultant power to drive wheel 178 and to motor generator 172 is described as vehicle 100 in the above description, the present invention is also applicable to other types of hybrid cars. That is, the present invention is also applicable, for example, to a so-called series hybrid car which uses engine 176 only for driving motor generator 172 and generates a driving force of the car only by motor generator 174, a hybrid car in which only regenerative energy out of kinetic energy generated by engine 176 is recovered as electric energy, a motor-assisted hybrid car in which an engine is used for main mechanical power and a motor assists the engine as necessary, and the like.

The present invention is also applicable to an electric vehicle not including engine 176 but traveling only with electric power, and a fuel cell car including a fuel cell in addition to power storage device 150 as a DC electric power supply. The present invention is also applicable to a vehicle not including boost converter 162, and a vehicle not including DC/DC converter 142.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST

10 vehicle power feeding system; 100 vehicle; 110 power reception unit; 112, 340 secondary self-resonant coil; 114, 350 secondary coil; 120 camera; 130, 240 communication unit; 135 height sensor; 140 rectifier; 142 DC/DC converter; 150 power storage device; 162 boost converter; 164, 166 inverter; 172, 174 motor generator; 176 engine; 177 power split device; 178 drive wheel; 180 control device; 182 touch display; 184 PA switch; 186 power feeding request switch; 190 voltage sensor; 200 power feeding apparatus; 210 power supply device; 220 power transmission unit; 230 light emission unit; 310 high-frequency power supply; 320 primary coil; 330 primary self-resonant coil; 360 load; 410 parking assist ECU; 420 steering ECU; 430 vehicle ECU; 440 motor control ECU; 450 charging ECU; 460 guidance control unit; 470 vehicle control unit; SMR1, SRM2 system main relay.

The invention claimed is:

1. A parking assist device for a vehicle in which electric power transmitted from a power transmission unit of a power feeding apparatus provided outside of the vehicle can be received by a power reception unit in a non-contact manner and stored in a power storage device, comprising:
    a vehicle control unit for controlling said vehicle to perform position adjustment between said power transmission unit and said power reception unit based on a power receiving situation of said power reception unit; and
    a height sensor for sensing change in a vehicle height of said vehicle,
    said vehicle control unit using a relation between said power receiving situation and a distance between said power transmission unit and said power reception unit, which is predetermined according to an output from said height sensor, to perform said position adjustment based on the output from said height sensor and said power receiving situation.

2. The parking assist device for a vehicle according to claim 1, further comprising:
    an image taking device for taking an image of outside of said vehicle; and
    a guidance control unit for controlling said vehicle to guide said vehicle to said power transmission unit based on the image taken by said image taking device, wherein
    the control by said vehicle control unit is performed when said vehicle has been guided by said guidance control unit to a predetermined position with respect to said power transmission unit.

3. The parking assist device for a vehicle according to claim 1, wherein
    a plurality of maps each indicating the relation between said power receiving situation and said distance are prepared in advance according to outputs from said height sensor, and
    said vehicle control unit selects one of said maps based on an output from said height sensor, and uses the selected map to perform said position adjustment based on said power receiving situation.

4. The parking assist device for a vehicle according to claim 3, wherein
    each of said maps defines a relation between said power receiving situation and an amount of positional deviation of said power reception unit with respect to said power transmission unit, and
    said vehicle control unit uses the one of said maps selected based on the output from said height sensor to estimate said amount of positional deviation based on said power receiving situation, and performs said position adjustment based on the estimated result.

5. The parking assist device for a vehicle according to claim 1, wherein said power reception unit is fixed to an underbody of said vehicle.

6. The parking assist device for a vehicle according to claim 1, wherein said height sensor is provided on a suspension of said vehicle, and senses change in said vehicle height by measuring an amount of sinking of said vehicle with respect to a predetermined reference position.

7. A parking assist device according to claim 1, wherein the power receiving situation is a receiving voltage of the power reception unit.

8. A parking assist device according to claim 1, wherein the power receiving situation is an efficiency of electric power transmission from the power transmission unit to the power reception unit.

9. An electrically powered vehicle comprising:
a power reception unit configured to receive electric power transmitted from a power transmission unit of a power feeding apparatus provided outside of the vehicle in a non-contact manner;
a power storage device for storing the electric power received by said power reception unit;
a motor that receives electric power supply from said power storage device and generates traveling torque; and
a parking assist device which includes:
a vehicle control unit for controlling said vehicle to perform position adjustment between said power transmission unit and said power reception unit based on a power receiving situation of said power reception unit; and
a height sensor for sensing change in a vehicle height of said vehicle,
said vehicle control unit using a relation between said power receiving situation and a distance between said power transmission unit and said power reception unit, which is predetermined according to an output from said height sensor, to perform said position adjustment based on the output from said height sensor and said power receiving situation.

10. The electrically powered vehicle according to claim 9, the parking assist device further comprising:
an image taking device for taking an image of outside of said vehicle; and
a guidance control unit for controlling said vehicle to guide said vehicle to said power transmission unit based on the image taken by said image taking device, wherein
the control by said vehicle control unit is performed when said vehicle has been guided by said guidance control unit to a predetermined position with respect to said power transmission unit.

11. The electrically powered vehicle according to claim 9, wherein
a plurality of maps each indicating the relation between said power receiving situation and said distance are prepared in advance according to outputs from said height sensor, and
said vehicle control unit selects one of said maps based on an output from said height sensor, and uses the selected map to perform said position adjustment based on said power receiving situation.

12. The electrically powered vehicle according to claim 11, wherein
each of said maps defines a relation between said power receiving situation and an amount of positional deviation of said power reception unit with respect to said power transmission unit, and
said vehicle control unit uses the one of said maps selected based on the output from said height sensor to estimate said amount of positional deviation based on said power receiving situation, and performs said position adjustment based on the estimated result.

13. The electrically powered vehicle according to claim 9, wherein said power reception unit is fixed to an underbody of said vehicle.

14. The electrically powered vehicle according to claim 9, wherein said height sensor is provided on a suspension of said vehicle, and senses change in said vehicle height by measuring an amount of sinking of said vehicle with respect to a predetermined reference position.

15. An electrically powered vehicle according to claim 9, wherein the power receiving situation is a receiving voltage of the power reception unit.

16. An electrically powered vehicle according to claim 9, wherein the power receiving situation is an efficiency of electric power transmission from the power transmission unit to the power reception unit.

* * * * *